United States Patent [19]

Dlugos, Sr. et al.

[11] Patent Number: 5,153,842
[45] Date of Patent: Oct. 6, 1992

[54] INTEGRATED CIRCUIT PACKAGE LABEL AND/OR MANIFEST SYSTEM

[75] Inventors: Daniel F. Dlugos, Sr., Huntington, Conn.; Robert Chen, Spring Valley, Ohio

[73] Assignee: Pitney Bowes Inc., Stamford, Conn.

[21] Appl. No.: 474,872

[22] Filed: Feb. 5, 1990

[51] Int. Cl.⁵ ............................................. G06F 15/20
[52] U.S. Cl. .................................... 364/478; 235/380
[58] Field of Search ........ 364/478, 468, 408, 401-403, 364/464.01-464.03; 235/380, 379, 375, 385

[56] References Cited

U.S. PATENT DOCUMENTS

| | | | |
|---|---|---|---|
| 3,971,916 | 7/1976 | Moreno | 235/61.7 B |
| 4,002,886 | 1/1977 | Sundelin | 235/61.7 R |
| 4,211,919 | 7/1980 | Ugon | 235/487 |
| 4,222,516 | 9/1980 | Badet et al. | 235/492 |
| 4,271,352 | 6/1981 | Thomas | 235/375 |
| 4,298,793 | 11/1981 | Melis et al. | 235/487 |
| 4,500,880 | 2/1985 | Gomersall et al. | 340/825.35 |
| 4,575,621 | 3/1986 | Dreifus | 235/380 |
| 4,656,463 | 4/1987 | Anders et al. | 340/572 |
| 4,667,087 | 5/1987 | Quintana | 235/380 |
| 4,713,761 | 12/1987 | Sharpe et al. | 364/406 |
| 4,797,832 | 10/1989 | Axelrod et al. | 364/478 |
| 4,827,395 | 5/1989 | Anders et al. | 364/468 X |
| 4,942,534 | 7/1990 | Yokoyama et al. | 364/468 |
| 4,959,788 | 9/1990 | Nagata et al. | 235/379 X |
| 4,974,166 | 11/1990 | Maney et al. | 364/478 |
| 5,015,830 | 5/1991 | Masuzawa et al. | 235/380 |

OTHER PUBLICATIONS

Kunz, R.; The Chip Card-Multifunction Card of the Future; Hasler Review, vol. 19, No. 4, 1986; pp. 71-78.
Tamada, M. et al.; IC Card System; Toshiba Review, No. 159, Spring 1987; pp. 30-33.
The Wharton Report, No. 104; The Smart Card; Apr. 1987; pp. 1-2, 4, 8.
Abrahams, Paul; Information Technology in Finance; Cost Factor is Crucial; Financial Times; Nov. 10, 1988, Survey p. IV.

*Primary Examiner*—Joseph Ruggiero
*Attorney, Agent, or Firm*—Robert H. Whisker; Melvin J. Scolnick

[57] ABSTRACT

An integrated circuit card includes a microprocessor, a memory and input and output devices. The card stores information regarding a parcel. The card is secured to the parcel and serves as a label. The card includes a liquid crystal display that displays a bar code.

A similar integrated circuit card stores manifest data regarding a group of parcels. The card containing the manifest data is delivered to a carrier together with the group of parcels.

8 Claims, 10 Drawing Sheets

```
PITNEY BOWES, INC.
WALTER WHEELER JR DRIVE
STAMFORD, CT  06926-0700
                              UNITED PARCEL
                             SHIPPING CHARGES
```

| TRANS | INVOICE NUMBER | ZIP/ZONE | WT | CHARGES | COD | DV | AOD | OS | CT |
|---|---|---|---|---|---|---|---|---|---|
| 1 | 12341 | 789 /7 | 2 | 9.95 | | 200.00 | | * | |
| 2 | 56324 | 235 /4 | 2 | 1.63 | | | | | |
| 3 | 65322 | 08653/A | 2 | 4.00 | 400.00 | | | | |
| 4 | 65322-01 | 785 /7 | 2 | 2.01 | | | | | |
| 5 | 65322-02 | 080 /2 | 3 | 1.32 | | | | | |
| 6 | 65322-03 | 080 /2 | 1 | 1.23 | | | | | |
| 7 | 2533 | 452 /4 | 2 | 1.63 | | | | | |
| 8 | 8511 | 080 /2 | 2 | 1.24 | | | | | * |
| 9 | 45222 | 45632/K | 2 | 12.50 | | | * | | |
| 10 | 5231 | 985 /8 | 1 | 1.74 | | | | | |

```
SUMMARY    8 GROUND - INTER
           0 GROUND - INTRA
           0 CANADA
           1 NEXT DAY AIR
           0 NEXT DAY AIR LETTER
           1 SECOND DAY AIR
```

|  |  | WEIGHT | CHARGES | COD | AOD | TOTAL |
|---|---|---|---|---|---|---|
| TOTAL | 10 COUNT | 19 lbs | | 1 | 1 | |
| TOTAL CHARGES | | | $37.25 | $1.90 | $.30 | $39.45 |

EXCESS VALUE:    1 UNITS    $.25

| CLASS | EFF DATE | CLASS | EFF DATE | CLASS | EFF DATE | CLASS | EFF DATE |
|---|---|---|---|---|---|---|---|
| NXDAY | 06/03/85 | NXLTR | 06/03/85 | 2-DAY | 06/03/85 | CAN51 | 05/19/86 |
| CAN52 | 05/19/86 | CAN53 | 05/19/86 | NDLEU | 09/15/86 | DOCEU | 09/15/86 |
| NDOEU | 09/15/86 | CLTAG | 01/01/85 | GRND | 01/01/85 | | |

A1200 PITNEY BOWES, INC.
REV A

INTEGRATED CIRCUIT PACKAGE LABEL AND/OR MANIFEST SYSTEM

BACKGROUND OF THE INVENTION

Shipment of a parcel requires that information accompany the parcel as it is prepared for shipment, picked up by the carrier, transported, sorted, delivered to the recipient, unpacked, and so forth. The accompanying information (hereinafter called "parcel information") often falls into the following categories, among others: name and address of sender; name and address of recipient; routing codes; parcel identification number; name of carrier; date of shipment; C.O.D. amount; amount of declared value or insurance; shipping charges including charges for special services such as C.O.D. or declared value; purchase order number, date, etc.; invoice number, date, amount, etc.; packing list; and picking list.

The accompanying information is commonly in the form of alphanumeric characters printed on a label that is affixed to the parcel or on a piece of paper packed inside the parcel or carried along with the parcel. A limited amount of information, such as the routing code or the parcel identification number, may be printed in bar coded form on the parcel or on a label that is then affixed to the parcel.

The alphanumeric and/or bar coded form of the information has a number of disadvantages.

Alphanumeric information can be read by machines only with difficulty. Optical character readers (OCR's) are expensive. The type font, spacing and print quality of the characters, and their orientation and distance relative to the OCR, must be carefully controlled for accurate reading to occur.

Bar code readers are less expensive and more flexible than OCR's, but print quality, as well as orientation and distance relative to the reader, are still significant issues. Human intervention is usually required to establish the correct proximity and orientation between the bar code and the reader. If two or more bar codes are applied to the parcels at various times or for various purposes, human or machine errors in reading may easily occur. Soiling in transit or other damage to the bar coded label may also prevent proper reading.

A further disadvantage of alphanumeric characters and bar codes is the amount of physical surface area required to accommodate them. Only a limited number of alphanumeric characters can be printed on a shipping label before it becomes cluttered and difficult to read. Similarly, an accompanying sheet of paper can hold only so much alphanumeric information. If the number of accompanying sheets is increased, the chances of the sheets being lost or out of order also increases.

Bar codes also take up a significant amount of surface area. As the bar coded area increases so do the problems of distance and orientation relative to the reader as well as the amount of human time and attention required to insure proper reading.

In addition to a label affixed to each parcel and packing lists and other documents relating to a single parcel, it is common for groups of parcels to be accompanied by a document referred to as a manifest. The manifest is in a form and contains information required by the parcel carrier. It typically lists all the parcels in the group by parcel identification number, and indicates the shipping charge for each parcel. Other information typically included for each parcel in the group is parcel weight, destination zone, declared value, C.O.D. amount and the like. The manifest also usually states the total shipping charge for the entire group of parcels.

When the parcel carrier's representative picks up the group of parcels from the shipper he also receives the manifest. The carrier's representative uses the manifest to check the number and description of the group of parcels. Later the carrier's billing department uses the manifest to generate a bill to the shipper. The carrier may also use the information on the manifest for other purposes such as keeping track of operations.

Providing a manifest in paper form carries some disadvantages. When there are a large number of parcels in the group, the manifest consists of many pages, some which may be lost or placed out of order. Printing a lengthy manifest at the end of a day may delay dispatch of the parcels. The carrier's capture of data from the manifest, for billing and other purposes, is onerous, requiring a great deal of manual or keyboard entry of information.

It is accordingly an object of this invention to provide a more convenient and efficient form in which to transport information related to and accompanying parcels.

It is a further object of this invention to provide a more convenient form in which to store information relating to the contents of a storage location for goods.

SUMMARY OF THE INVENTION

The above objects are achieved and the disadvantages of the prior art are overcome in accordance with the subject invention by means of an integrated circuit card that is attached to a parcel and includes a microprocessor connected to a memory and to an input device and an output device. The card stores information related to the parcel. Information may be stored on the card by an automatic terminal The information stored on the card may be read by an automatic terminal.

According to another aspect of the invention, an integrated circuit card stores information comprising a manifest for a group of parcels.

According to still another aspect of the invention an integrated circuit card is associated with a storage location and stores information related to goods stored in the storage location

DETAILED DESCRIPTION OF THE PREFERRED EMBODIMENTS

Description of I.C. package label

Figure 1A:
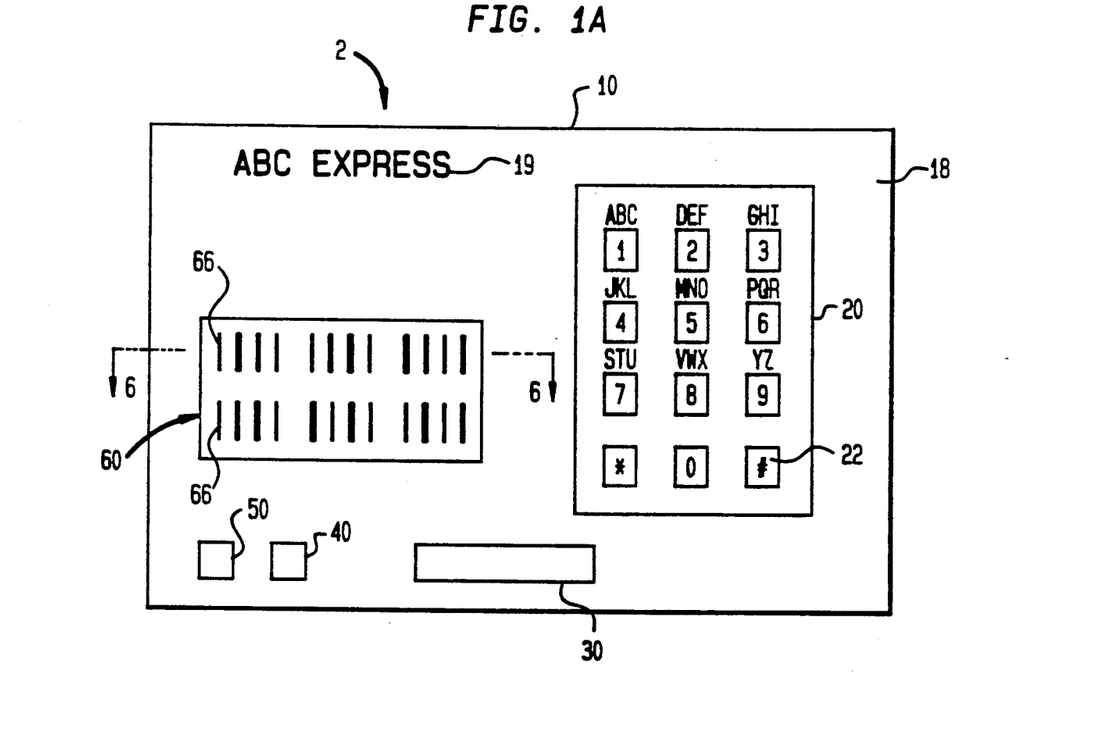
FIG. 1A is a plan view of an integrated circuit package label in accordance with the present invention.
Figure 6:
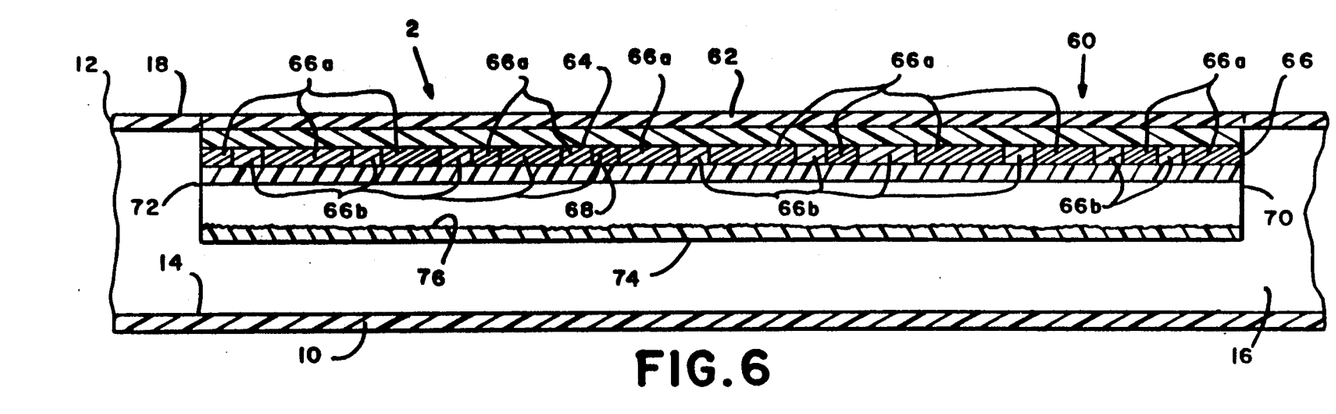
FIGS. 6 and 6A are partial cross sectional views of the label, taken along the line 6—6 of FIG. 1.

Referring to FIGS. 1A and 6, an integrated circuit package label 2 is shown in accordance with the present invention. Label 2 is generally in the form of a conventional integrated circuit card (or "smart card") and includes a card shaped plastic body 10. The plastic body 10 includes a central section 16 that holds the electronic components of label 2. Plastic body 10 also includes top protective layer 12 and bottom protective layer 14. Protective layers 12 and 14 are transparent or light transmissive.

Label 2 has a top surface 18 on which information 19 is visible, such as the name of the owner or issuer of label 2. Information 19 may be printed or silk screened on central section 16 so that it is visible through protective layer 12.

Also visible on top surface 18 is display 60 which includes LCD segments 66 adapted to display bar codes. Also present on top surface 18 are keyboard 20, solar cell bank 30, sensor 40 and light emitting diode (LED) 50.

Figure 2:
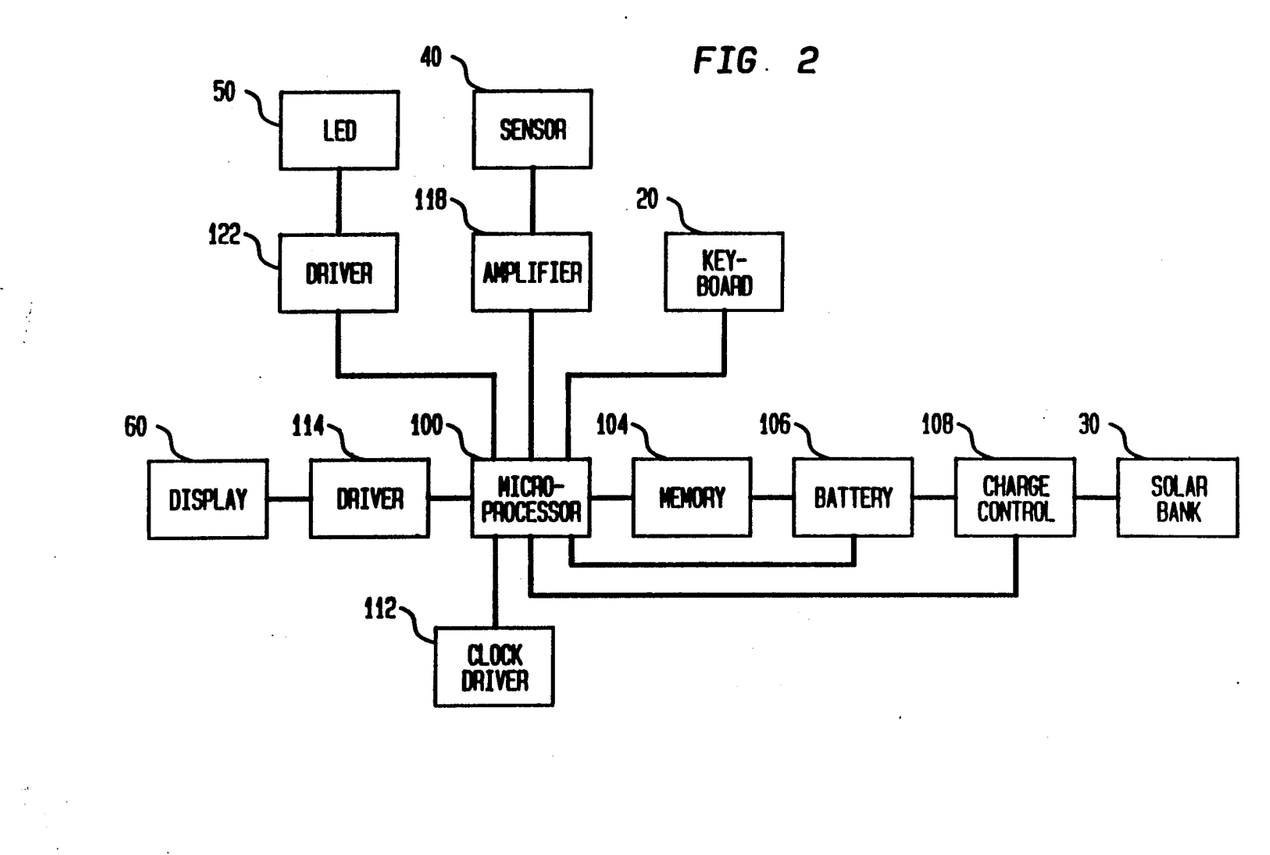
FIG. 2 is a block diagram of the label.

The electronic components of label 2 are shown in block diagram form in FIG. 2 and comprise microprocessor 100. Microprocessor 100 may be an Intel Model 80286 or any other processor with low power consumption.

Clock driver 112 is connected to microprocessor 100 and provides clock signals to the internal clock of microprocessor 100. Clock driver 112 may be a quartz crystal, an RC circuit, an LC tuned circuit or other or another conventional source of clock signals.

Microprocessor 100 is connected to memory 104. Memory 104 is shown in more detail in FIG. 9 and advantageously comprises read only memory (ROM) 130 for storing operating software for label 2. Memory 104 further comprises random access memory (RAM) 132 for use during operation of label 2, and nonvolatile memory such as electrically erasable programmable read only memory (EEPROM) 134 or a memory backed up by a battery (which may be battery 106 or another battery which is not shown). ROM 130, RAM 132 and EEPROM 134 are each connected to microprocessor 100 via appropriate data, address and control lines 144 and are also connected to a power supply via appropriate circuitry 146.

Figure 9:
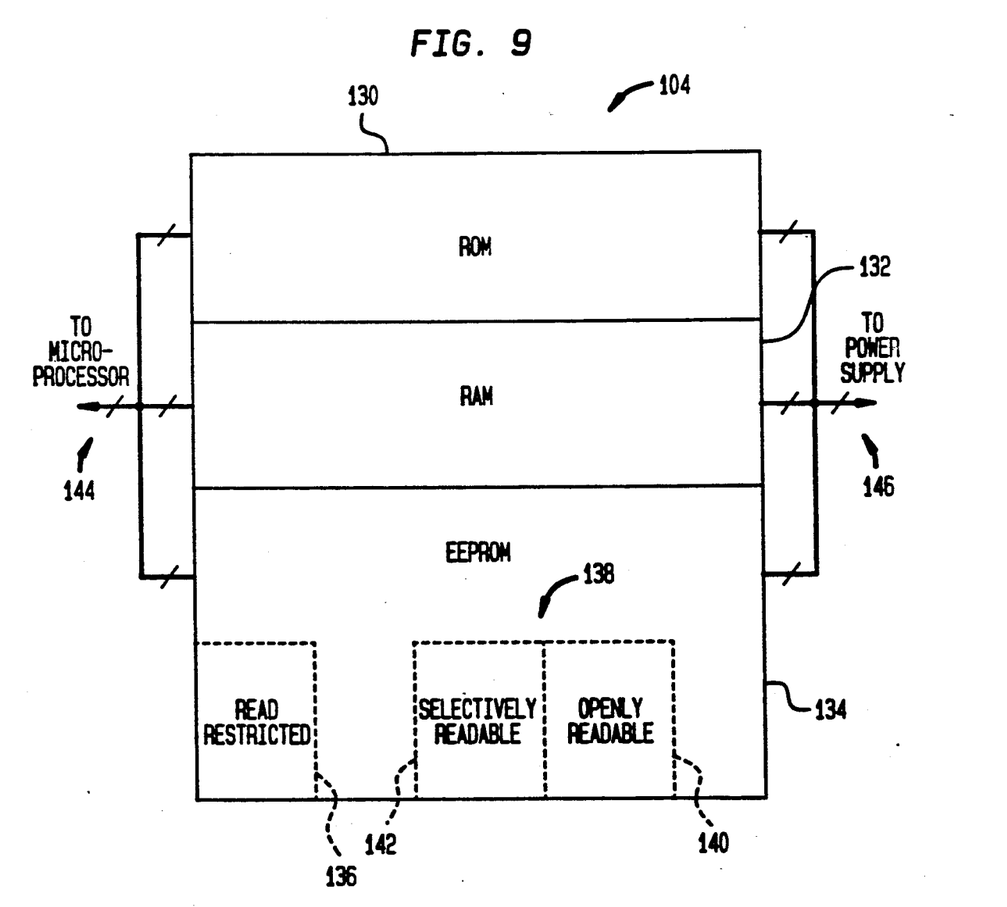
FIG. 9 is a diagram showing some details of the label's memory.

EEPROM 134 may comprise a write protected section 138 for storing serial numbers or other identification data, or other information stored therein by the manufacturer, distributor or owner and intended to be maintained permanently for the life of label 2. Section 138 may comprise an openly readable subsection 140 and a selectively readable subsection 142, subsection 142 being readable only after a password is input or another security requirement is complied with.

EEPROM 134 may further comprise a read protected section 136 into which data may be freely written, but from which data is selectively readable, again only after compliance with a security requirement. Applications using read protected section 136 are described below.

Returning to FIG. 2, microprocessor 100 is connected to battery 106 and is adapted to sense when battery 106 is in need of charging. Such sensing may be a function of the voltage level provided by battery 104 or of the response time of battery 104.

Battery 106 is connected to solar cell bank 30 through charge control circuit 108. Microprocessor 100 is connected to charge control circuit 108 so as to cause battery 106 to be charged by solar cell bank 30 when microprocessor 100 senses that battery 106 is in need of charging.

In an alternative embodiment, battery 106 may be a long-life battery, such as a lithium battery, for which not recharging is required. In such alternative embodiment, charge control circuit 108 and solar cell bank 30 are not required. In still another embodiment, a solar cell bank is included but no battery is required, label 2 being powered by ambient light or by light emitted from a read/write terminal. In this embodiment RAM 132 is used only for "scratch pad" purposes, and all data to be stored resides in EEPROM 134. It is also within the contemplation of this invention that label 2 receive power by means comprising an electret.

Microprocessor 100 is connected through amplifier 118 to sensor 40. Sensor 40 is adapted to sense pulsed or other data communications. The communications may be in the form of infrared, visible light, or other radiation, radio frequency transmissions, or variations in a magnetic field. For example, sensor 40 may take the form of an infrared pin diode input array. Acoustical or ultrasonic communication means are also within the contemplation of this invention. The communications protocol may be ASCII or echoplex or any other suitable protocol.

Microprocessor 100 is connected to light emitting diode (LED) 50 through driver circuit 122. LED 50 may be such as emits infrared radiation or may be of a type that emits visible light. Use of an integrated circuit laser in place of LED 50 is also within the contemplation of this invention. Again, ASCII, echoplex or another protocol may be used.

In another embodiment of the invention, a suitable antenna or antennae and radio frequency or another type of transmitting and receiving means are substituted for sensor 40, amplifier 118, LED 50 and driver 122.

Figure 6A:
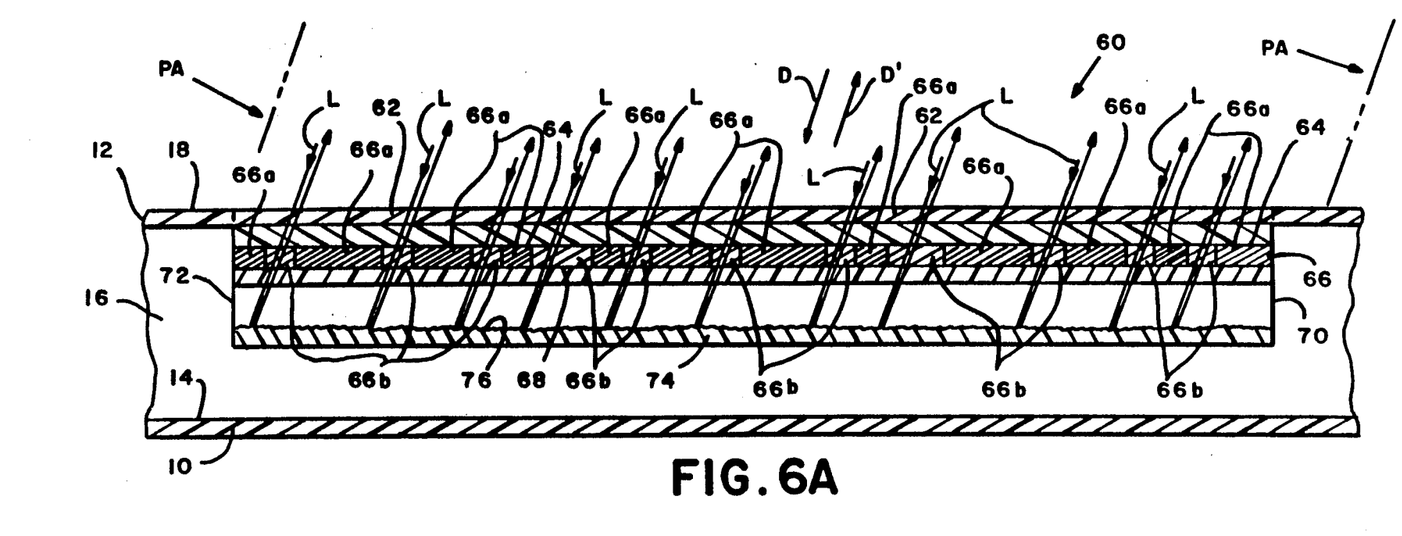

Microprocessor 100 is connected through driver circuit 114 to display 60. Referring to FIGS. 6 and 6A, display 60 includes transparent window 62. Below window 62 and between sidewalls 72, 70 are upper confinement surface 64 and lower confinement surface 68. Between confinement surfaces 64, 68 are held liquid crystal segments 66.

Segments 66 are formed so as to display bar codes upon proper outputs from microprocessor 100. As shown in FIGS. 6 and 6A, some of segments 66 denoted by reference numeral 66a are darkened and others, denoted by reference numeral 66b, are clear, forming a bar code display.

Display 60 also includes a bottom wall 74 to which adheres a retroreflective coating 76, comprising, for example, micro glass balls. Incident scanning light L, travelling in a direction D, along a path PA, does not pass through darkened segments 66a, but does pass through clear segments 66b, striking retroreflective coating 74 and being reflected thereby in a direction D' which is in the same path PA of direction D, but in an opposite direction to direction D.

Figure 1B:
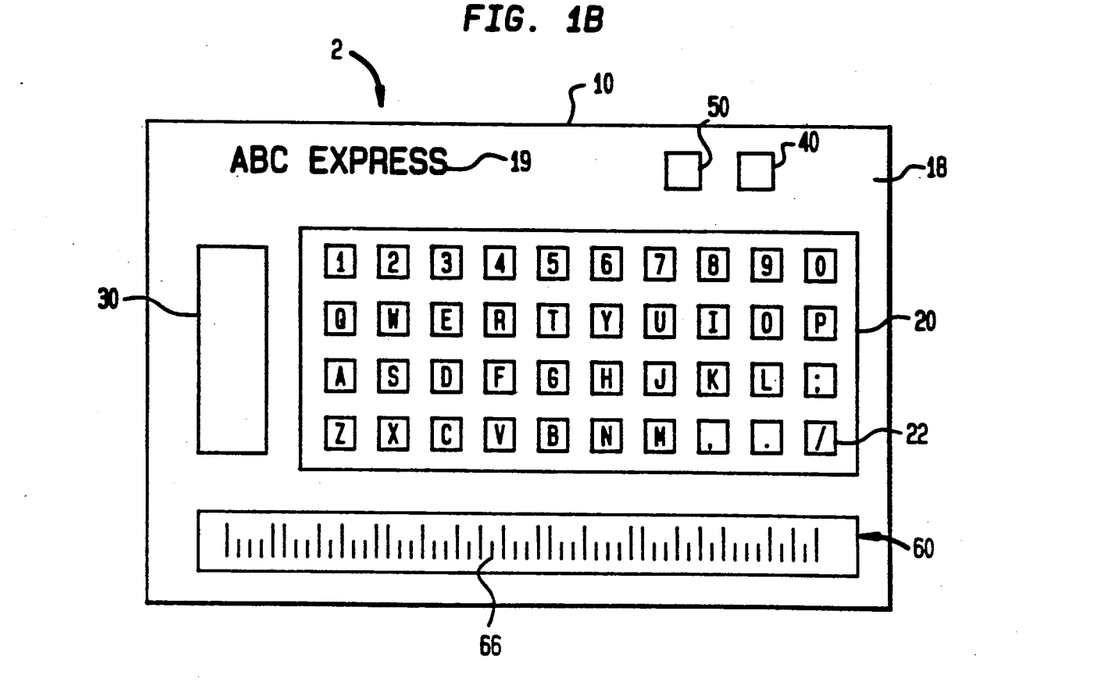
FIG. 1B is a plan view of another embodiment of an integrated circuit package label

The bar code displayed by display 60 may be any of the commonly used thick/thin bar and/or space codes, of which one example is shown on FIG. 1B and of which another example is, the Universal Product Code. The bar code may also be the Postal Numeric Encoding Technique (POSTNET) bar/half bar code used by the U.S. Postal Service for coding zip codes on envelopes as shown on FIG. 1B. A description of the POSTNET code may be found at Section 324.72 of the Domestic Mail Manual, published by the Postal Service.

In another embodiment of the invention, display 60 comprises LC segments capable of displaying alphanumeric characters. Alphanumeric information to be displayed by display 60 may advantageously take the form of letters and/or numerals in a continuous single line that scrolls from right to left across the display. In still another embodiment, display 60 displays bar codes at some times and alphanumeric information at other times.

In another embodiment, display 60 may comprise, instead of a bottom wall 74 with retroreflective surface 76, a window through to bottom protective layer 14. Such an embodiment is to be used with a reading device that emits light that passes through both window and is detected by scanning means disposed on the opposite side of label 2 from the light emitting means of the reading device.

Microprocessor 100 is also connected to keyboard 20, which has keys 22. As shown on FIG. 1, keyboard 20 resembles a conventional telephone keypad in which letters of the alphabet are associated with most of the numeric keys. By use of keyboard 20, a user can input numeric information by conventional procedures and alphabetic information may be input by a procedure such as that disclosed in U.S. Pat. No. 4,800,582. Alternatively, keyboard 20, as shown in FIG. 1A comprises a key 22 for each alphanumeric character as shown in FIG. 1A. As another alternative, a shift key can be included, in which case character keys would represent a first character when the shift key is actuated and a second character when the shift key is not activated. The keyboard layouts shown in FIGS. 1 and 1A are by way of example. Many other layouts are possible.

It should be understood that, in another embodiment of the invention, keyboard 20 may be eliminated, in which case a terminal, as described below, would be used to operate label 2 and to write information into memory 104.

Figure 4:
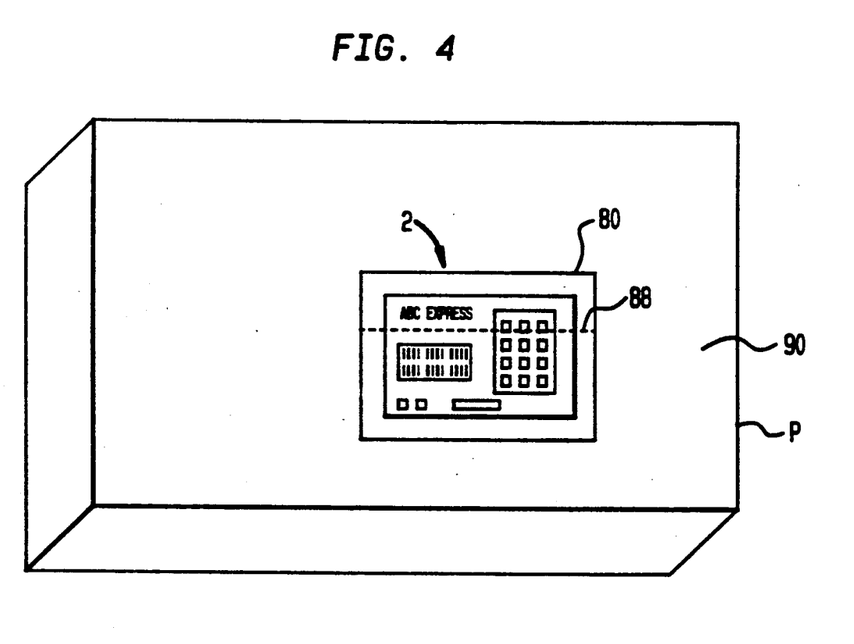
FIG. 4 is a perspective view of a parcel with a label attached thereto in accordance with the present invention.
Figure 5:
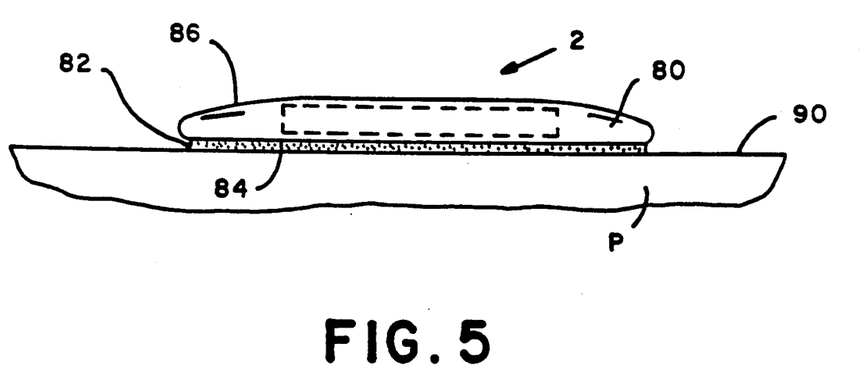
FIG. 5 is a side view of a parcel with a label attached thereto in accordance with the present invention.

FIGS. 4 and 5 show label 2 attached to parcel P. Label 2 is held within envelope 80. Envelope 80 may be formed of, for example, a clear plastic film or a protective packing material containing air bubbles. Envelope 80 has a top portion 86 and a bottom portion 84. An adhesive layer 82 is provided on the outside surface of bottom portion 84. Adhesive layer 82 is in contact with and adheres to top surface 90 of parcel P, thus attaching label 2 to parcel P.

A perforated opening 88 is provided in upper portion 84 of envelope 80, allowing label 2 to be easily inserted into or removed from envelope 80.

In another embodiment of this invention label 2 is attached to parcel P by means of an adhesive layer provided directly upon bottom protective layer 14 of label 2. In still another embodiment label 2 is attached to parcel P by suitably mating velcro portions provided on top surface 90 of parcel P and bottom protective layer 14 of label 2. In still a further embodiment, a rigid plastic clip or bracket is secured on top surface 90 of parcel P, and label 2 is inserted into the clip or bracket. Alternatively the velcro attachment method may be combined with the clip or bracket method.

It should be understood that the embodiments of label 2 shown in FIGS. 1 and 1A are examples of many possible embodiments. Among other variations, label 2 could be configured with the POSTNET display 60 as shown in FIG. 1A and the 12-key keyboard 20 of FIG. 1. As another alternative, label 2 could include the conventional bar code display 60 of FIG. 1 and the 40-key keyboard 20 of FIG. 1A.

In other embodiments, plastic body 10 and label 2 may be of an overall shape or size different from the standard credit card shape and size (approximately 85×54 mm) shown in FIGS. 1 and 1A. For example, plastic body 10 and label 2 could remain planar and rectangular but be longer in either or both planar dimensions, as compared to the FIG. 1 embodiment. As another alternative, the electronic components of label 2 could be integrated into a plastic body 10 that forms a reusable mailer. One form of such a reusable mailer could be used for fulfillment of prescriptions by mail order and would comprise a cylindrical cavity for holding a prescription bottle.

Description of read/write terminal

Figure 7:
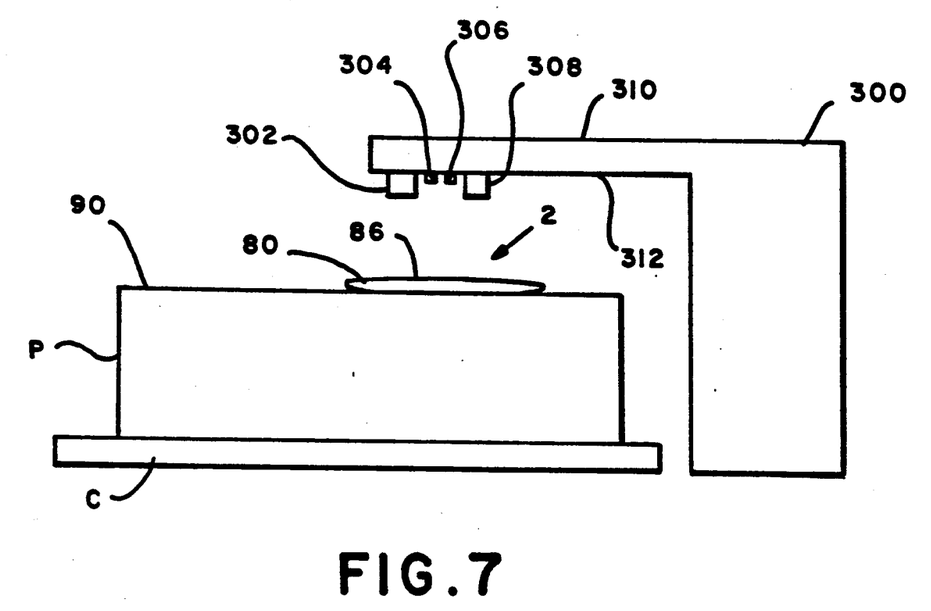
FIG. 7 is a side view of a terminal station for writing data into the label and reading data from the label.

FIG. 7 shows a read/write terminal station for use with integrated circuit labels. Label 2 is held within clear plastic film envelope 80, which is attached to parcel P. Parcel P rests on conveyor C.

Terminal 300 has an arm 310 with an underside 312. Provided on underside 312 are light source 302, LED 304, sensor 306 and bar code scanner 308. Light source 302 is for providing power to label 2 through solar cell bank 30. LED 304 is for transmitting communications to be received by label 2 through sensor 40. Sensor 306 is for receiving communications transmitted by label 2 through LED 50. Bar code scanner 308 is for scanning and reading bar codes displayed on display 60.

It should be understood that label 2 is disposed within envelope 80 so that top surface 18 is facing upwards and so is presented for interaction with terminal 300.

Figure 8:
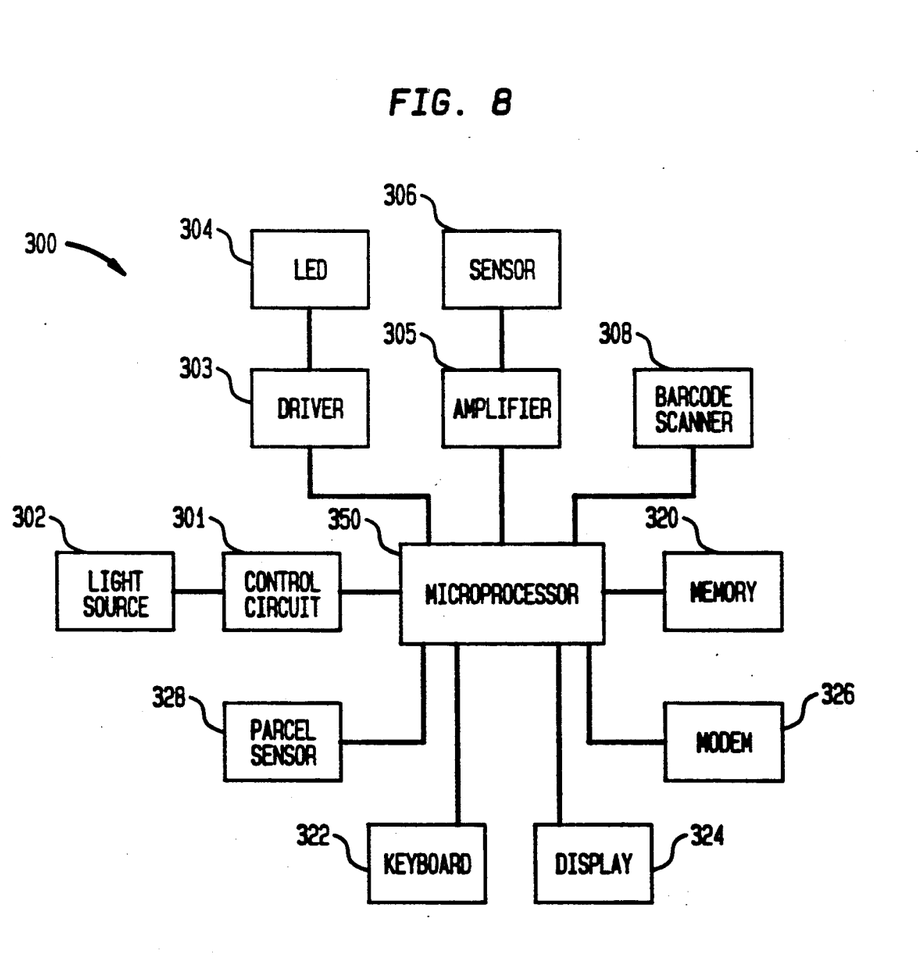
FIG. 8 is a block diagram of a terminal for writing data into the label and reading data from the label.

FIG. 8 shows the electronic components of terminal 300. Microprocessor 350 is connected through amplifier 305 to sensor 306. Microprocessor 350 is also connected to LED 304 through driver 303. Through central circuit 301 microprocessor 350 controls light source 302. Microprocessor 350 is also connected to bar code scanner 308.

Parcel sensor 328 is also connected to microprocessor 350. Parcel sensor 328 may consist of a pressure sensor appropriately located under conveyor C, or an optical sensor, or any conventional article sensor as is used in electronic article surveillance. In the latter case, it is assumed that label 2 or parcel P is provided with marking circuitry or such other type of marker as may be sensed by parcel sensor 328.

Microprocessor 350 is also connected to conventional memory means 320, and to keyboard 322 and display 324 which allow interaction with a human operator. Microprocessor 350 is also interfaced to modem 326 for communication, by way of example, with a host computer. Optionally, microprocessor 350 may also be interfaced to a printer (not shown), if it is desired that terminal 300 be capable of printing, for example, activity reports.

As will be recognized by those skilled in the art, terminal 300 may take a variety of forms, some of which do not require a number of the components shown in FIG. 8. For example, in a terminal intended to interact with a label only at the instance of a human operator, no parcel sensor would be required. As another example, a terminal intended to operate automatically without human intervention would not require a display or keyboard. As a further example, no modem is required if there is to be no communication with a host computer or other devices.

To provide a further example, no light source or control circuit therefor is needed if the terminal is to be used with labels powered by permanent batteries, or batteries that are charged by mean other than the terminal.

Further, if as noted above, label 2 comprises antennae and transmitting and receiving means in substitution for sensor 40 and LED 50, the terminal would be equipped with corresponding antennae and transmitting and receiving means, instead of driver 303, LED 304, amplifier 305 and sensor 306.

Still another version of the terminal, as for a parcel sorting application, might be intended only to read bar code from labels, in which case driver 303, LED 304, amplifier 306 and sensor 306 are not required.

Another type of terminal might interact with labels via direct electrical contacts. In that case, labels would be required to include an appropriate system of contacts. An example of such a contact system may be found in U.S. Pat. No. 4,222,516.

Read/Write Operations

Figure 3:
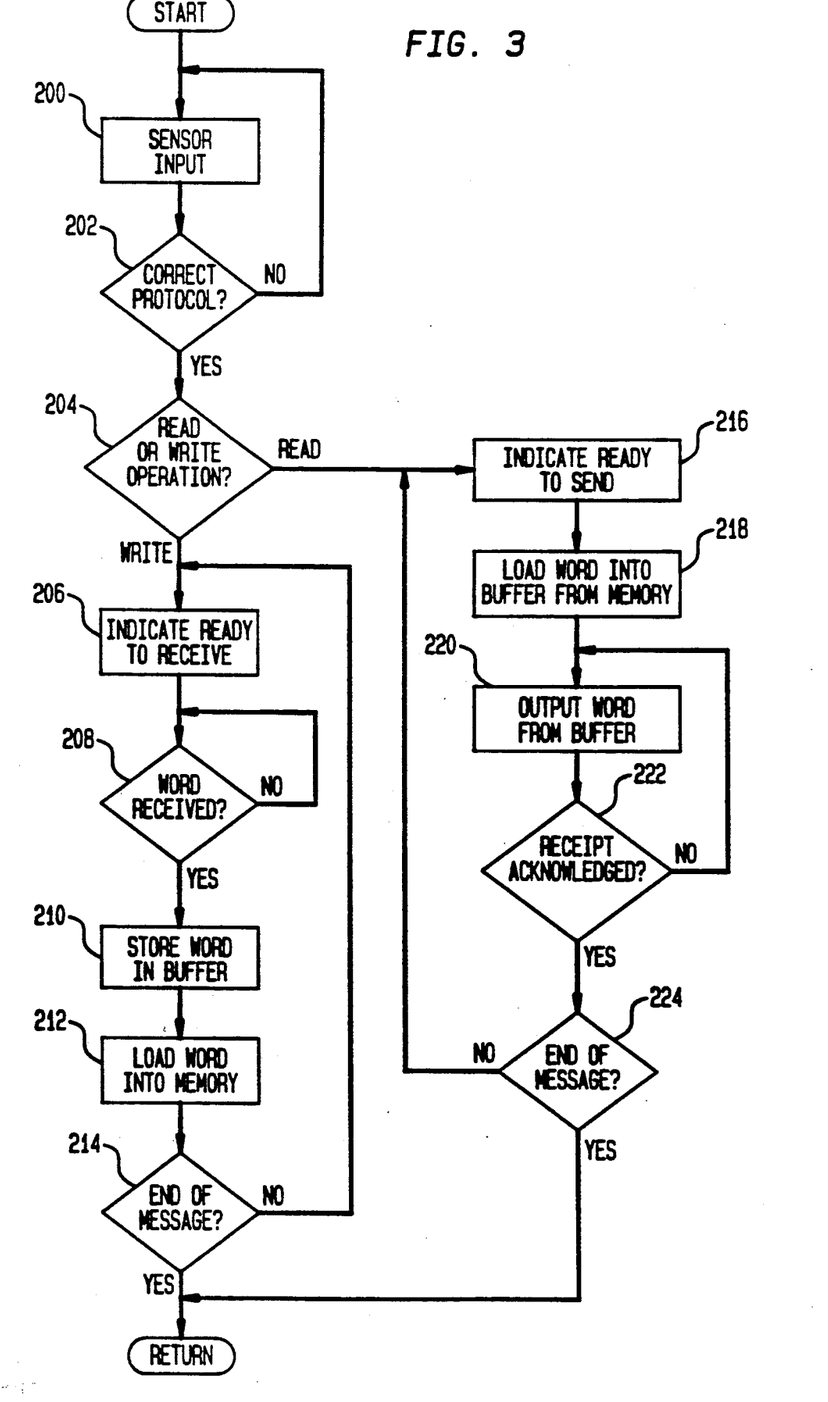
FIG. 3 is a flow chart for a computer program to carry out operations for writing data into the label and reading data from the label.

FIG. 3 illustrates the operation of label 2 when information is to be written into memory 104 or read from memory 104. It should be understood that in most cases the read or write operation will involve EEPROM 134.

A read/write operation begins with sensor 40 sensing an input (step 200). Microprocessor 100 then determines whether a correct protocol has been sensed (step 202). If the protocol is not correct, label 2 then waits for another input. If the protocol is correct, microprocessor 100 determines whether a read or write operation has been indicated (step 204). If it is a write operation, microprocessor 100 causes LED 50 to output a "ready to receive" signal (step 206). Microprocessor 100 then waits until a word has been received through sensor 40 (step 208). Once a word has been received, it is stored in a buffer (step 210) and then loaded into memory 104 (step 212). Microprocessor 100 then determines if end of message has been indicated (step 214). If not, microprocessor 100 again causes LED 50 to output a "ready to receive" signal (step 206) and the write operation continues as before. If at step 214 end of message was indicated, the read/write operation ends.

If at step 204 a read operation, rather than a write operation, has been indicated, microprocessor 100 causes LED 50 to output a "ready to send" signal (step 216). Microprocessor 100 then causes a word to be loaded from memory 104 into a buffer (step 218). Microprocessor 100 then causes the word to be output (step 220). It should be understood that the outputting may be accomplished through LED 50 or through display 60, or by both means. Microprocessor 100 then determines whether it has received a signal acknowledging receipt of the outputted word (step 222). If receipt is not acknowledged the word is output again through LED 50 or continues to be displayed by display 60, as the case may be. If receipt is acknowledged, microprocessor 100 determines whether the message has ended (step 224). If the message has not ended, microprocessor 100 again causes LED 50 to output a "ready to send" signal (step 216) and the read operation continues as before. If at step 224, microprocessor 100 determines that the message has ended, the read/write operation ends.

Fulfillment/Shipping applications

There are many potential applications for an integrated circuit package label as disclosed herein. By way of example, a parcel carrier can supply labels to its customers for attachment to parcels that will be transported by the carrier.

The carrier's customer (sender of the parcel) uses the label from the beginning to the end of the order fulfillment cycle. Initially, the sender inputs into the label sender information including name, address and sender identification number. Alternatively, this information may already have been input by the carrier or may be present as a result of a previous use of the label by the sender. Immediately after an order is received, recipient information (such as billing name and address, account number), order information (such as order number, item numbers, quantities, prices), and shipping information (such as destination address, mode of delivery, handling instructions), are all input into the label. The label is then delivered to the warehouse in lieu of a picking list. At the warehouse, a terminal reads the label and either prints a picking list, or carries out an automated picking process.

From this point forward the label accompanies the order to its destination, with information read from the label and additional information written into the label at various stages along the way. For instance, upon completion of the picking process, information can be added reflecting date and time of picking, identifying the employee responsible for picking and recording the serial numbers of the items picked for the order. If it was not possible to fulfill the order, or if the order was only partially fulfilled, or fulfilled with substitute items, appropriate information can be written into the label. The label can later be read, if desired, as part of a quality control check for the picking process.

When the order is packed and prepared for shipment, the label is attached to the parcel as described above. Information from the label is read by a parcel scale or computerized parcel shipping system (also known as a manifesting system) or a terminal interfaced thereto for such purposes as selecting routes and shipping modes, calculating shipping charges, preparing manifests, billing, maintaining accounting records. Additional information is written into the label, including some or all of: date and time of shipment, routing codes (which may include a postal zip code), shipping mode, shipping charges, handling charges, manifest number, invoice number, weight of parcel. Information read by a terminal 300 can be uploaded to a host computer so that a central record of order fulfillment can be maintained.

It should be understood that the shipper's procedures may call for some of the input information to be stored only in read protected section 136 of the label's memory. For example, the shipping charge may be stored in read protected section 136, with the carrier enabled to read the shipping charge information but the recipient (shipper's customer) not so enabled. In that case, the shipper will be free to bill the recipient a "shipping and handling" charge that is higher than the actual shipping charge without fear that the recipient will raise the actual charge as an objection to the billed "shipping and handling charge." As another example, the value of the goods shipped may be stored in read protected section 136 so that especially valuable parcels cannot be readily identified by individuals who may be inclined to steal them.

Once the parcel has been turned over to the carrier, the carrier may read the label for such purposes as recording date and time of receipt, or verifying manifest or waybill information or for receiving notice of C.O.D. and/or insurance obligations. Additional information written into the label at this point may include date, time and place of receipt, carrier's parcel identification number for tracking purposes, routing information (such as airport or sorting codes), an indication that shipping charges (including C.O.D., insurance, etc.), have been paid or that the parcel has been cross-checked against a manifest, or information necessary for the carrier to bill the sender.

An automated sorting system, comprising one or more terminals 300 or the like, reads routing information through bar code scanner 308 or through sensor 306, and directs the parcel into an appropriate bin for dispatch to the next point en route. This process may occur at several points before the parcel is delivered. At each sorting point, or at other points along the way, terminals can be used to read parcel identification information from the label so as to track the progress of the parcel through the carrier's system. At those same points or others, the time, place and location of sorting or handling may be written into the label, so that the parcel carries with it a record of its path through the system.

In one type of application of the integrated circuit label, the carrier removes the label from the parcel at the destination, perhaps after a final read and/or write operation for recording date, time and place of delivery, payment of C.O.D. charges, name of individual recipient, and so forth. The label is returned to the carrier's premises, where some or all of the information accumulated during fulfillment, shipment and delivery can be read by a terminal and uploaded to a host computer for billing, market analysis, operational analysis or other purposes.

Appropriate nonpermanent portions of the label's memory are then cleared, the label is provided to another shipper or the same shipper and the entire process is repeated. In this way each label may be reused many times.

Alternatively, the label remains attached to the (parcel) after delivery. The label is read by the recipient's terminal for such purposes as matching to a purchase order, checking the contents of the parcel, verifying the invoice, or auditing the carrier's charges or service performance, If the items contained in the parcel are to be resold by the recipient, the label may continue to accompany those items, undergoing virtually the same process as described before. Otherwise, when the recipient has read all the information he requires from the label, he may clear the appropriate nonpermanent portions of the memory and then either reuse the label on his own outgoing parcel or return the label to the carrier or the shipper for reuse.

As another alternative, the label is returned to the shipper with all information intact so that the label also functions as a return receipt. The information, including data on when and to whom the parcel was delivered, is read by a terminal 300 and then uploaded to a host computer, to complete the central record of fulfillment operations. If the carrier was unable to deliver the parcel, appropriate information would have been written into label, including, for instance, parcel damaged, rejected, C.O.D. not collectable, address not good, etc. Only after this final data capture is the nonpermanent information erased from the label's memory.

There are many possible variations of the applications described above. For example, instead of using the label throughout the fulfillment-shipment-delivery-post delivery process, the label may be used only during a part of that process—e.g., only while the parcel is in the carrier's possession. In another application the I.C. label is removed before the parcel is consigned to the carrier. The I.C. is replaced by a paper label printed using the information stored on the I.C. label, and the I.C. label is then recycled by the shipper for other picking/packing operations.

Further, the shipper or the recipient may be the originator of the label. An instance of the latter case might be a government agency that requires its suppliers to attach an integrated circuit package label issued by the agency to each parcel shipped to the agency. In such an application, the use of the label may begin before fulfillment, e.g., by the agency writing ordering information into the label and then sending it to the supplier with, or instead of, a purchase order. (Alternatively, the ordering agency may electronically transmit the ordering information to the supplier, who writes the information into an I.C. label that has such characteristics as the agency mandates). The supplier reads the ordering information from the label and commences fulfillment. The process continues through picking of goods, attachment of the label to the parcel, shipment, delivery, post-delivery information capture and reuse of the label as described above. In this way the integrated circuit package label of the present invention can be used to implement a "paperless" ordering and supply system.

It will be appreciated from the foregoing that the supplier, the purchaser or the carrier may be the entity that puts an I.C. label system into operation.

Storage applications

Integrated circuit labels according to the present invention can also be used in warehouse or storage applications. In such applications a label is associated with each storage location (which may be a shelf, rack, cage, bin or yard). The association may take the form of attachment of the label to or near the location. One way in which the label can be attached is by sliding or placing it into a bracket or fixture. The fixture may include electrical contacts corresponding to contacts provided on the label. Alternatively, communication may be made by infrared or other noncontact means.

Initially information representing the type and number of items stored in a location is written into the label associated with the location. Thereafter, each time additional items are stored in the location, or items are removed from the location, corresponding information is written into the label. The information may be stored in the label in cumulative form only (i.e., just the types and total number of items), or may also include dates, times and amounts of additions and removals, so that each transaction is recorded. The information stored in the label may also include: the serial or batch number of items stored at or removed from the location, date of storage or removal of a specific item, transaction or order number under which the item was purchased for addition to inventory, or transaction or order number for fulfillment of which the item was removed from inventory.

A human carrying a reader, or a robot incorporating a reader, may when looking for an item, interrogate each label until the appropriate location is found. When it is desired to learn the number of items present at the location, as for the purpose of taking inventory, the information may be read by a "host" terminal that communicates through direct electrical contacts or by infrared or other contactless means, as discussed above. Alternatively, a handheld reading unit may be used.

I.C. Card Manifesting System

Figure 10:
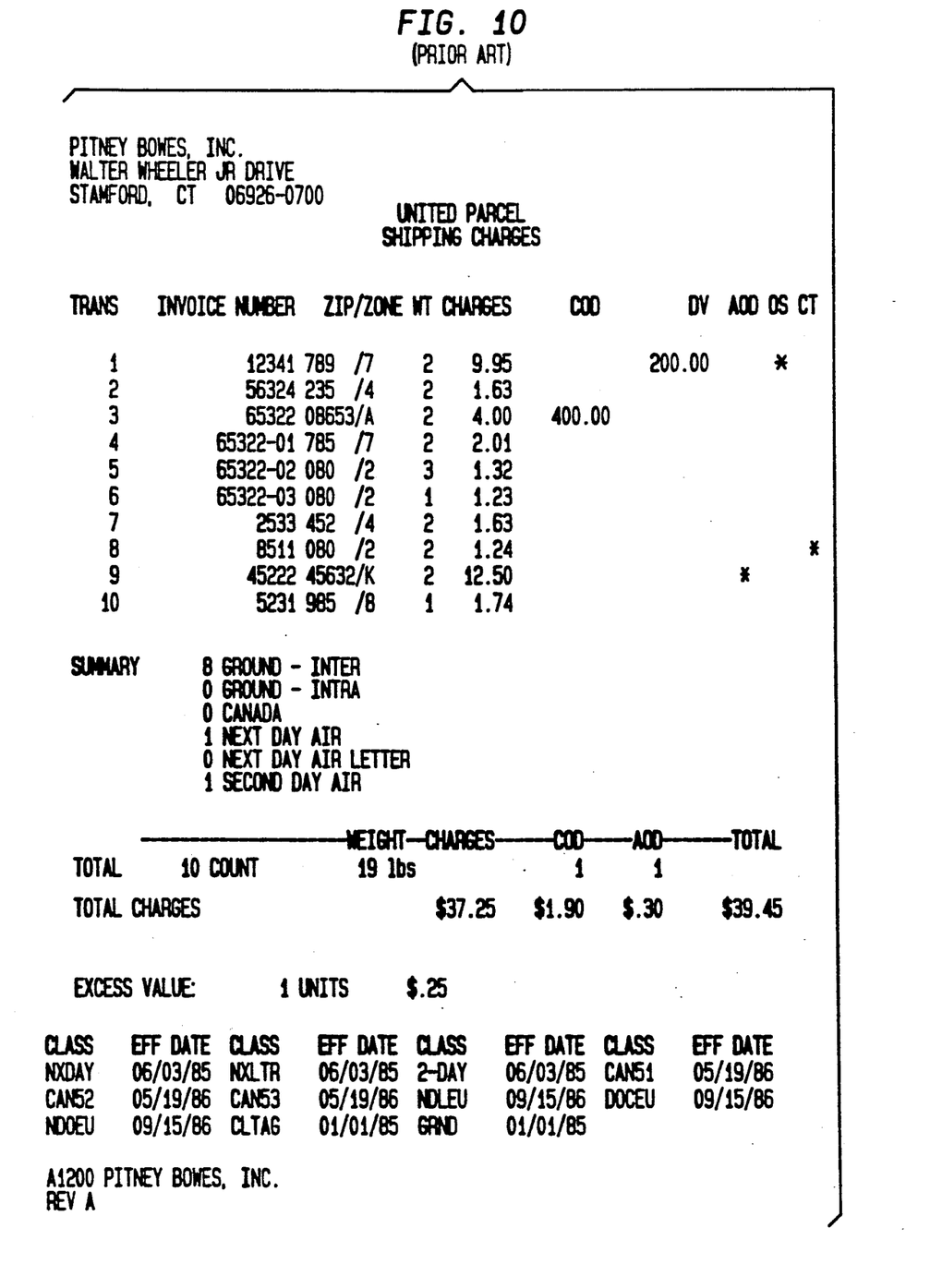
FIG. 10 is an example of a paper manifest according to prior art.

An example of a paper manifest according to the prior art is shown as FIG. 10. As noted above, the manifest contains data required by a parcel carrier relating to a group of parcels to be consigned to the carrier for shipment. The carrier usually mandates the format of the manifest as well as the content.

According to the present invention, data relating to a group of parcels is stored in an integrated circuit card which is referred to hereinafter as "manifest card". The data stored on the manifest card is of the types and in the format required by the parcel carrier that will transport the group of parcels. These data will be referred to as "manifest data". The manifest data commonly includes for each parcel: parcel identification information; transaction number; destination information; requested mode of transport/class of service; requested special services (e.g. C.O.D., insurance); weight; and shipping charge. In addition the manifest data commonly includes shipper identification information, date of shipment, total count of parcels, and total shipping charge for the group of parcels. The manifest card takes the form of one of the embodiments of an integrated circuit package label 2 as disclosed herein. Preferably the manifest card does not comprise a display or a keyboard. Input and output of data takes place through direct electrical contracts or transmitting and receiving means as described above.

Input and output of data to and from manifest card 2' is accomplished with a terminal 300. Terminal 300 has electrical contacts or transmitting and receiving means, and operates with a communications protocol, that are compatible with the manifest card Referring to FIG. 11, in a preferred embodiment, terminal 300 is interfaced to a conventional manifesting system 400 (such as the STAR200 Manifesting System available from Pitney Bowes Inc., Stamford, Conn. Manifesting system 400 comprises computer 402, display 404, keyboard 406, scale 408, and bar code scanner 410. Computer 402, display 404 and keyboard 406 can be standard microcomputer components, computer 402 comprising one or more floppy or hard disk drives. Scale 408 can be a conventional electronic scale such as model A-217 available from Pitney Bowes. Scale 408 comprises parcel receiving means 412, which can be a conventional scanner such as model F-117 available from Pitney Bowes. Manifesting system 400 may also comprise one or more printers (not shown).

Figure 11:
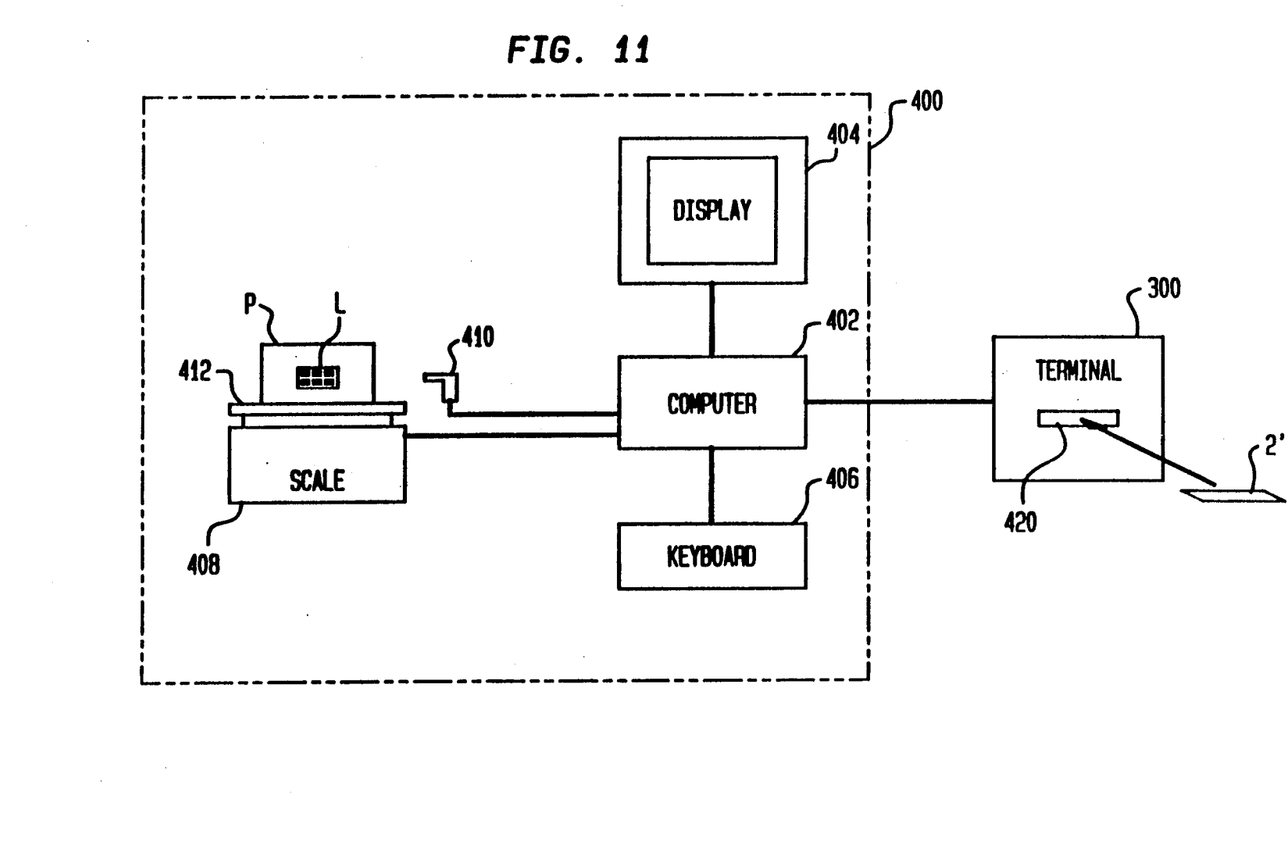
FIG. 11 is a block diagram of an I.C. card manifesting system according to the present invention.

Terminal 300 comprises slot 420, into which manifest card 2' is inserted for input of data from terminal 300 and output of data to terminal 300. Alternatively, the transmitting and receiving means of terminal 300 and manifest card 2' may be such as are operable when terminal 300 and manifest card 2' are in proximity to each other. In this case, no slot 420 is required.

As manifesting system 400 is conventional, the following brief description of its operation should be sufficient. Parcel P bearing label L is placed on parcel receiving means 412 of scale 408. Scale 408 weighs parcel P and provides weight information to computer 402. Bar code scanner scans label L and provides parcel identification information to computer 402. (It should be understood that Label L or another Label L' may also contain weight information in bar coded form, which information is scanned by bar code scanner 410 and thereby input to computer 402. In this case, parcel P is not weighed by scale 408 It should also be understood that weight information and/or parcel identification information may be input to computer 402 by the operator via keyboard 406 instead of by scale 408 and/or bar code scanner 410).

Via keyboard 406, and guided by information presented on display 404, the operator inputs destination information, selects a shipping mode (including carrier and class of service) selects any desired special services, and inputs additional information as required for the selected special services. Based on the information received from scale 408, bar code scanner 410 and keyboard 406, computer 402 generates manifest data for parcel P and for each other parcel in the group of parcels.

Turning now to operation of terminal 300 and Manifesting System 400 in accordance with the present invention, in a "real time" mode of operation with terminal 300, computer 402 transmits to terminal 300 manifest data for each parcel immediately after each parcel weighing and service selection transaction is completed. Terminal 300 then inputs into manifest card 2' the manifest data for each parcel as that data is received from computer 402. When the last parcel in the group has been processed by manifesting system 400 or at a later convenient time, computer 402 generates and transmits to terminal 300 the manifest data that is not specifically related to a single parcel; e.g. shipper identification information, date of shipment, total count of parcels, and total shipping charge. Other summary information as required by the carrier, may also be generated by computer 402 and transmitted to terminal 300. Terminal 300 inputs the non-parcel-specific manifest data into manifest card 2' upon receipt of the data from computer 402. (It will be appreciated that, alternatively, computer 402 may be programmed to generate and transmit before the entire group of parcels is processed, those types of non-parcel-specific manifest data that do not depend on the make-up of the group of parcels. Such types of data include shipper identification information and date of shipment.)

In a "batch" mode of operation, computer 402 generates and stores all manifest data and then transmits all the manifest data to terminal 300 at one time and after the entire group of parcels has been processed. Terminal 300 inputs into manifest card 2' the batch of manifest data upon receipt thereof from computer 402. Alternatively, terminal 300 stores the manifest data for input to manifest card 2' at a later convenient time. The batch mode is particularly advantageous when processing of the group of parcels is mingled in time with processing of other parcels, such as parcels to be dispatched via a different carrier.

As will be appreciated by those skilled in the art, in the real time or batch mode of operation, terminal 300, rather than computer 402, may be programmed to generate some or all of the non-parcel-specific manifest data. For those types of non-parcel-specific manifest data which depend on the make-up of the group of parcels (e.g. total charges or summaries), terminal 300's generation of that data is based on the parcel-specific manifest data received from computer 402.

It will further be appreciated that a batch mode of operation may be accomplished by intermittent or real time transmission of manifest data by computer 402 for storage in terminal 300. In this situation, terminal 300 does not input the manifest data into manifest card 2' until processing of the entire group is complete and all manifest data has been generated and transmitted by computer 402 or generated by terminal 300, as the case may be.

It is an advantage of the batch mode that manifest card 2' need not be present in slot 420 until the time comes to input into manifest card 2' all of the manifest data for the group of parcels.

It will be appreciated that instead of the personal computer based manifest system 400 shown in FIG. 11, a scale based manifesting system may be interfaced to terminal 300. One example of such a scale based manifesting system is the STAR 110 available from Pitney Bowes Inc., in which an electronic scale, a keyboard, a small display and a microprocessor are integrated into a single housing.

After the group of parcels is ready for shipment, and all of the manifest data has been input into manifest card 2', the parcels and card 2' are handed over to the carrier. Typically, this will occur at a regularly scheduled pick up stop that the carrier's representative makes each day at the shipper's premises.

Advantageously, the carrier's truck is equipped with a terminal 300 that comprises a printer and preferably a display as well. The carrier's representative inspects manifest card 2' into the terminal, which reads the manifest data from manifest card 2' and outputs it in human readable form via the display and/or the printer. The carrier's representative then uses the output manifest data to verify that the manifest data accurately reflects the group of parcels that he has received. The truck terminal is programmed to input into manifest card 2' such information as date and time of pick-up, truck identification information, carrier's representative identification information, an authorization code, and point of origin. This information will be referred to as "consignment information". The truck terminal advantageously comprises a keyboard through which the carrier's representative enters some of the information to be input into manifest card 2'.

After all required information has been input into manifest card 2' by the truck terminal, the truck terminal prints out a document including all of the manifest data, part of which was input by the truck terminal). This document is handed to the shipper as a receipt for the group of parcels, possibly after use for verification purposes by the carrier's representative as mentioned above.

It will be appreciated that delivery to the shipper of a paper receipt at the time of pick-up is not essential. For instance, the shipper may be content to store the manifest information in computer 402 or terminal 300 or in an integrated circuit card that duplicates manifest card 2'. Alternatively, the carrier's office may use a terminal 300 to read the manifest data from manifest card 2' in order to produce a paper receipt that is mailed to the shipper.

If the procedure does not require delivery of a printed receipt at the time of pick-up, and if the carrier's representative uses manifest data output via the display to verify the group of parcels, then it will be recognized that the truck terminal need not include a printer. Similarly, if printed output is used for verification, the display can be dispensed with.

After pickup, the carrier's representative transports the group of parcels and manifest card 2' to the carrier's depot. There a terminal 300 may be used to read the manifest data from manifest card 2' and to output the manifest data in human readable form for another verification of the group of parcels.

It is a major advantage of the integrated circuit card manifest system as disclosed herein, that manifest data read from manifest card 2' by the carrier's terminal 300 can be communicated by the terminal 300 to a host computer. The manifest data can then be used by the host computer for the purpose of preparing bills to the shipper thereby avoiding the large amount of keyboard data entry required by paper manifest systems. The host computer can also use the manifest data for tracking the progress of the parcels through the carrier's transportation system and for reporting on the carrier's operations.

As was the case with integrated circuit labels, the carrier may erase the manifest data from manifest card 2' and send it to a shipper for reuse. Alternatively, the shipper-specific portion of the manifest data may be preserved, in which case manifest card 2' is returned for reuse by the same shipper. Of course, in this situation the shipper specific portion of the manifest data need not be generated by computer 402 or terminal 300, nor input again into manifest card 2'.

Use of I.C. Card Manifesting System with I.C. Package Labels

Up to this point, there have been separately described applications respectively using integrated circuit package labels and integrated circuit manifest cards. However, it is further advantageous to employ I.C labels and manifest cards together in a single application.

As a simple example of such a combined application, and referring again to FIGS. 11 and 1A, label L can be an integrated circuit label 2 as described above, with a display 60 that displays a bar code that is read by bar code scanner 410.

According to another application, when the system of FIG. 11 is operated in a batch mode as described above, a label 2 is inserted into slot 420 of terminal 300 before parcel P is processed. Parcel information generated by computer 402 is input into label 2, which is then attached or reattached to parcel P. Before the next parcel is processed, another label 2 is inserted into slot 420, and the process continues. As described above, all of the manifest data generated by computer 402 or terminal 300 is input into manifest card 2' after completion of processing of the entire group of parcels. (It should be understood that in addition to, or instead of, writing parcel information into label 2, terminal 300 may read parcel information from label 2, which parcel information is then communicated to computer 402 to be used in generating manifest data).

In another embodiment, the system of FIG. 11 comprises more than one terminal 300. A first terminal 300 is used to write parcel information into, and possibly also to read parcel information from, a label 2 that has been or will be attached to parcel P. A second terminal 300 corresponds to that shown in FIG. 11 and is used for inputting manifest data into manifest card 2', and possibly also for reading manifest data from manifest card 2'. In the latter situation the manifest data read from manifest card 2' is communicated to computer 402, which causes the first terminal 300 to write into a label 2 parcel data based upon that manifest data from manifest card 2'.

Similarly a terminal 300 standing alone, or in communication with a second terminal 300, may be programmed to (a) read parcel information from a label 2 and input manifest data into a manifest card 2', or (b) read manifest data from a manifest card 2' and input parcel information into a label 2, or (c) perform both (a) and (b).

It will be apparent to those skilled in the art that variations and modifications may be made to the embodiments described herein without departing from the spirit and scope of the invention. Accordingly, it is intended in the following claims to cover each such variation and modification as falls within the true spirit and scope of the claimed invention.

As used herein, it should be understood that "parcel" means an item to be mailed or shipped, regardless of shape or size, including letters. "Parcel" may also mean (a) a pallet holding a number of items or (b) a group of cartons or containers wrapped together or otherwise consolidated for shipment together.

What is claimed is:

1. A method of placing an order for an item and of fulfilling said order, comprising the steps of:
   (a) inputting item ordering information into an integrated circuit card;
   (b) sending said card containing said input item ordering information to a supplier of said item;
   (c) reading said input item ordering information from said card;
   (d) packing said item into a parcel for shipment;
   (e) inputting parcel information into said card;
   (f) securing said card to said parcel;
   (g) transporting said parcel with said secured card; and
   (h) reading from said card said input parcel information.

2. A method of transporting a parcel together with parcel information regarding said parcel, comprising the steps of:
   (a) securing an integrated circuit card to said parcel;
   (b) inputting said parcel information into said integrated circuit card; and
   (c) transporting said parcel together with said secured integrated circuit card, after said parcel information has been input into said card; and,
   (d) delivering said parcel to a recipient, inputting delivery information into said card, removing said card from said parcel, and returning said card to the sender of said parcel, said card functioning as a return receipt evidencing delivery of said parcel to said recipient.

3. The method of claim 2, wherein the step of securing said card to said parcel precedes the step of inputting said parcel information into the card.

4. The method of claim 2, wherein the step of inputting said parcel information into said card precedes the step of securing said card to said parcel.

5. A method of transporting a parcel together with parcel information regarding said parcel, comprising the steps of:
   (a) securing an integrated circuit card to said parcel;
   (b) inputting said parcel information into said integrated circuit card;
   (c) transporting said parcel together with said secured integrated circuit card, after said parcel information has been input into said card;
   (d) reading said input parcel information; and,
   (e) removing said card from said parcel, securing said card to a second parcel, inputting into said card parcel information regarding said second parcel, and transporting said second parcel together with said secured integrated circuit card.

6. The method of claim 5, wherein the step of securing said card to said parcel precedes the step of inputting said parcel information into the card.

7. The method of claim 5, wherein the step of inputting said parcel information into said card precedes the step of securing said card to said parcel.

8. The method of claim 5, further comprising the step of controlling parcel sorting equipment to sort said parcel in accordance with said read parcel information.

* * * * *